United States Patent [19]
Bharucha et al.

[11] 4,088,793
[45] May 9, 1978

[54] CONTROL OF NITROSAMINE FORMATION IN NITRITE CURED MEAT

[75] Inventors: Kekhusroo R. Bharucha; Leon J. Rubin, both of Toronto; Charles K. Cross, Rexdale, all of Canada

[73] Assignee: Canada Packers Limited, Toronto, Canada

[21] Appl. No.: 762,745

[22] Filed: Jan. 26, 1977

[51] Int. Cl.² .............................................. A23B 4/02
[52] U.S. Cl. .................................. 426/266; 426/281; 426/641; 426/645; 426/652
[58] Field of Search ............... 426/264, 265, 266, 268, 426/281, 332, 545, 652; 260/289 N

[56] References Cited
U.S. PATENT DOCUMENTS

| | | | |
|---|---|---|---|
| 2,553,533 | 5/1951 | Komarik et al. | 426/265 |
| 2,828,212 | 3/1958 | Sair | 426/652 |
| 3,154,421 | 10/1964 | Voegeli et al. | 426/652 X |
| 3,347,677 | 10/1967 | Jaworski et al. | 426/545 |
| 3,966,974 | 6/1976 | Bharucha et al. | 426/265 |

OTHER PUBLICATIONS

Lin, J. S., et al., "Ethoxyquin Nitroxide", J. Agric. Food Chem., 23 No. 4, 1975, pp. 798–800.

*Primary Examiner*—Raymond N. Jones
*Assistant Examiner*—R. A. Yoncoskie
*Attorney, Agent, or Firm*—Bacon & Thomas

[57] ABSTRACT

Nitroxide derivatives of 1,2-dihydro- and 1,2,3,4-tetrahydro-6-alkoxyquinolines are used for reducing or eliminating the formation of undesirable nitrosamines which are generated when nitrite cured meat, such as bacon, is cooked at the temperatures usually attained during frying, grilling or broiling.

23 Claims, No Drawings

CONTROL OF NITROSAMINE FORMATION IN NITRITE CURED MEAT

CO-PENDING APPLICATIONS

This application is related to co-pending application Ser. No. 632,793 filed on Nov. 17, 1975 by Michael Herder Coleman and to co-pending application Ser. No. 643,558 filed on Nov. 22, 1975 by Kekhusroo R. Bharucha and Michael Herder Coleman.

BACKGROUND OF THE INVENTION

This invention relates to control of nitrosamine formation in nitrite cured meat.

Cured meat products have been prepared for many years by treatment of fresh meat with an alkali metal nitrite-containing composition or with a composition containing a mixture of alkali metal nitrite and an alkali metal nitrate. Sodium chloride is generally present in the curing mixture and other materials such as sugar may also be present. Spices may be added. Ascorbic acid, isoascorbic acid (sometimes called erythorbic acid) or salts of ascorbic acid or isoascorbic acid are sometimes used to accelerate the formation of cured meat pigments.

The conventional alkali metal nitrite or nitrate-nitrite containing curing mixtures provide quite satisfactory cures insofar as cured-meat preservation, flavor, and development of the pink to red color characteristic of cured meats are concerned. Nitrates were at one time used alone and then one had to depend on bacterial action for their conversion to nitrites during the curing process. No practical substitute for the nitrite ion in the curing process has yet been discovered.

Unfortunately, minute amounts of undesirable nitrosamines may occur in meats, particularly bacon, which have been cured with the conventional nitrite curing mixtures, and which have been cooked by methods in which the fats reach relatively high temperatures. For example, N-nitrosopyrrolidine and dimethylnitrosamine are found on frying bacon, the cook-out fat containing the largest proportion of these volatile nitrosamines with N-nitrosopyrrolidine being present in the greater amount. These nitrosamines are not found in the cured raw meats. Apparently, the temperature attained by the fats in frying or equivalent cooking processes, such as broiling, grilling, microwave heating, etc., facilitates the reaction of alkali metal nitrites and amines of the meat to form nitrosamines. Since N-nitrosopyrrolidine and dimethylnitrosamine have been found to be carcinogenic in tests on experimental animals, they are regarded as a potential hazard in human food products. It is desirable, therefore, to reduce, eliminate or prevent the formation of these substances in cooked meat products. It is disclosed in the afore-mentioned application Ser. No. 632,793 that 1,2-dihydro-6-alkoxyquinolines, e.g. ethoxyquin, a known food antioxidant, are useful for this purpose. It is further disclosed in the aforementioned application Ser. No. 643,558 that 1,2,3,4-tetrahydro-6-alkoxyquinolines, e.g. dihydroethoxyquin, are also useful for this purpose.

SUMMARY OF THE INVENTION

The present invention utilizes nitroxide derivatives of 1,2-dihydro- and 1,2,3,4-tetrahydro-6-alkoxyquinolines for reducing or eliminating the formation of undesirable nitrosamines which are generated when nitrite cured meat is cooked at the usual high temperatures attained during frying, grilling or broiling. The nitroxide derivatives are included in the curing solution or are otherwise added to the nitrite cured meat. The invention, in a more specific embodiment, relates to novel meat treating compositions, meat treating methods and nitrite cured meat products which make use of nitroxide derivatives of the formula:

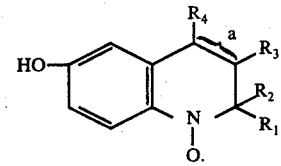

or a dimer thereof wherein the oxygen atom of the nitroxide group is bonded to a similar oxygen atom of another molecule, and wherein:

$a$ represents a single or double bond, and $R_1$, $R_2$, $R_3$ and $R_4$, which may be the same or different, are selected from the group consisting of hydrogen and alkyl of one to six carbon atoms, preferably one to four carbon atoms. Inert substituents, such as alkyl, may also be present in lieu of hydrogen on the carbon atoms of the benzene ring.

When a small amount of a nitroxide compound of the class described is included in the curing mixtures or is otherwise applied to nitrite-containing meat before cooking, the proportion of undesirable nitrosamines contained in the meat after cooking is drastically reduced and in some instances virtually eliminated.

It is therefore an object of the invention to provide meat curing compositions and methods which reduce or eliminate the formation of undesirable nitrosamines during subsequent cooking of the cured meat.

It is another object of the invention to provide a composition and method for curing bacon which reduces or eliminates the formation of undesirable nitrosamines in the bacon during the subsequent frying or equivalent cooking process.

A further object of the invention is to provide a nitrite cured meat product in which formation of undesirable nitrosamines during cooking is minimized.

DETAILED DESCRIPTION

Nitroxide compounds suitable for this invention may be prepared by oxidizing the corresponding 1,2-dihydro and 1,2,3,4-tetrahydro-6-alkoxyquinolines under conditions which provide the nitroxide group and optionally dealkylate the 6-alkoxy group to a 6-hydroxy group. It will be understood that, for purposes of the present invention, it is immaterial whether a 6-alkoxy group or 6-hydroxy group is present. Both compounds are believed to have the same anti-nitrosamine function. The 1,2-dihydro-6-alkoxyquinoline starting materials may be obtained commercially, as in the case of 1,2-dihydro-2,2,4-trimethyl-6-ethoxyquinoline (ethoxyquin) or may be prepared by condensation of aniline or a substituted aniline with a carbonyl compound such as acetone, methyl ethyl ketone, methyl isobutyl ketone and butyraldehyde, in the presence of a catalyst such as iodine, p-toluenesulphonic acid or sulphanilic acid, as described, for example, in U.S. Pat. No. 3,829,292. The 1,2,3,4-tetrahydro-6-alkoxyquinoline starting materials are either commercially available or are readily obtainable by any of a number of known chemical procedures. Preparation of representative compounds from the corresponding 1,2-dihydro-6-alkoxyquinoline compounds by hydrogenation in the presence of a nickel catalyst has been described in U.S. Pat. No. 2,846,435. They may also be prepared by hydrogenation of the corresponding 1,2-dihydro-6-alkoxyquinoline compound in the presence of a palladium/carbon catalyst.

Lin and Olcott [J. Agric. Food Chem. 23, 4,798 (1975)] reported the preparation of ethoxyquin nitroxide, as a stable free radical of the formula:

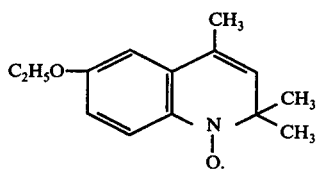

from ethoxyquin by the reaction of ethoxyquin with hydrogen peroxide in the presence of sodium tungstate and ethylene diamine tetracetic acid, disodium salt, in aqueous ethanol. We have found that the Lin and Olcott procedure results in the following reaction:

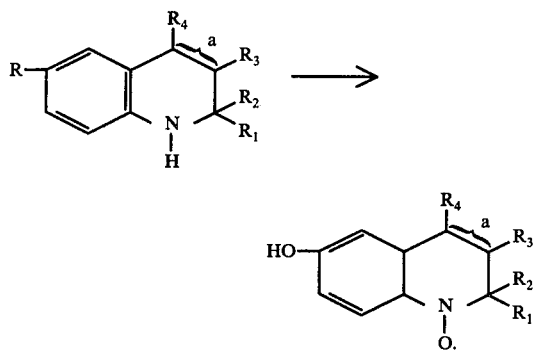

or the dimer

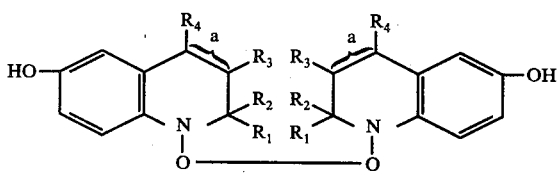

where R of the starting compound is alkoxy and $R_1$, $R_2$, $R_3$, $R_4$ and $a$ are the same as previously defined.

The dimer readily dissociates at temperatures above about 40° C to give the monomer I. Accordingly, when the dimer is incorporated in nitrite containing meat, it provides the free radical monomer I during the cooking of the meat. The latter compound interferes with the formation of the known undesirable nitrosamines during the meat cooking operation. It will be understood that either the free radical monomer or the dimer may be incorporated in the meat pursuant to this invention.

The compounds of the invention do not significantly affect the nitrosyl pigments of the cured meat, and so do not appreciably affect its color. Additionally, the compounds do not materially change the nitrite content of the raw cured meat products, and thus do not impair its anti-bacterial action. The mechanism by which the 1,2-dihydro- and 1,2,3,4-tetrahydro-6-hydroxyquinoline nitroxides interfere with the formation of nitrosamines at high temperature is not completely understood. However, the invention is not limited by any particular theory of operation. It has been shown by a series of tests with representative compounds that up to 100% of the nitrosamines which normally appear in fried bacon have been eliminated.

COMPOSITIONS AND METHODS OF APPLICATION

The compounds of the invention are introduced into nitrite cured meat in any convenient manner so as to provide an amount in the cured meat which is effective to reduce the nitrosamine content of the meat treated by the compound and cooked at frying temperature. In general, the compound is applied in a brine solution which is used to cure the meat or is applied before or after cure in solution in a suitable solvent to the surface of the meat. Combinations of both methods may be used.

The optimum amount of the compound to be incorporated in the meat may vary to some extent from one compound of the general formula to another. In general, the useful range is from about 1 to 200 ppm (parts per million), on a weight basis, of active compound to cured meat, with a preferred range being from about 10 to 100 ppm. The quantity of the active compound in the meat is extremely low but nevertheless is effective to materially reduce or eliminate the known nitrosamines of cooked cured meat products. The meat itself enjoys all of the advantages of the nitrite cure with respect to colour, flavor and protection against bacterial action.

A typical embodiment of the invention will now be described. A meat curing solution, also known as a pickle solution, is prepared in the usual manner.

The quantities of the various ingredients in the pickle solution can be varied widely depending on the meat to be cured and the type of cure. Typically, the curing solution may contain on a weight basis, in addition to water and nitrite salt sufficient to provide about 10 to 200 ppm of free nitrite in the meat, from about 5 to 25% NaCl, from about 4 to 12% of sugars, e.g. sucrose and dextrose, from 0.1 to 5% ascorbate or isoascorbate. In accordance with the present invention, from about 0.001% to 0.2% of 1,2-dihydro- or 1,2,3,4-tetrahydro-6-hydroxyquinoline nitroxide compound is also incorporated in this curing solution, preferably with the aid of from about 0.01 to 0.5% of an edible emulsifying agent.

Any suitable edible emulsifying agent that will facilitate the dispersion of the nitroxide compound in water may be used. Representative examples of emulsifying agents are the polyoxyalkylene derivatives of hexitol anhydride partial long chain fatty acid esters, known under the "Tween" trademark. However, the invention is not limited to the use of these representative substances.

The solution is then incorporated into the meat to be cured in any conventional manner, e.g. by soaking or injection. A combination of these procedures can be used. Thus, the meat can be soaked in the pickle solution for a sufficient time to permit diffusion of the solution throughout the meat. Alternatively, the pickle solution can be pumped through the vascular system of the meat cut or injected directly into the muscle by use of a plurality of needles. After pumping or injection, the meat cut may be given a soaking period in the pickle solution. In the case of bacon, the amount of pickle solution incorporated in the meat may be in the order of about 10%, and in the case of hams may be about 18%.

However, these amounts are subject to wide variations at the choice of the processor.

In the processing of bacon, hams and the like, after incorporation of the picle solution, the meat may be subjected to a conventional heating and/or smoking step. Typically, bacon is heated in this step to an internal temperature of about 55° C and larger cuts such as hams to an internal temperature of about 67° C.

In another embodiment of the invention, a solution or dispersion of the nitroxide compound may be applied to the meat after curing, e.g. a solution of the selected compound in a suitable liquid solvent medium may be sprayed or brushed on slices of the cured meat prior to packaging. Suitable liquids include edible oils as well as vaporizable solvents such as the lower aliphatic alcohols, e.g. ethanol and isopropanol. In general, concentrations of about 1 to 10% of the 1,2-dihydro- or 1,2,3,4-tetrahydro-6-hydroxyquinoline nitroxide compound in the liquid medium are used. These compositions are applied to the meat surfaces in amounts to provide from about 1 to 200 ppm based on the weight of the cured meat.

The invention can also be applied in the production of bacon by slice-cure procedures, such as that described in U.S. pat. No. 2,974,047.

It can very conveniently be applied in a baconcuring procedure in which sliced frozen pork is enclosed in a pack with brine containing an amount of nitrite such as will leave free nitrite, suitably in an amount 10 - 200 ppm of the meat, after the formation of the desired bacon colour; and the pack is sealed in vacuo and the cure is allowed to proceed, suitably by storage at room temperature. The salt content of bacon cured by this procedure, as of bacon cured by the known procedures, is usually in the range of 3-10% sodium chloride weight/weight of aqueous phase of the cured meat.

The invention can also be applied to the reduction of nitrosamine-forming capacity in other cured meat products, either beef or pork, including corned beef, wieners and bologna.

EXAMPLES OF PRACTICE

The invention will be further illustrated by the following examples of practice:

EXAMPLE 1

Nitroxide from Ethoxyquin

A mixture of freshly distilled ethoxyquin (4.62g), sodium tungstate dihydrate (0.47g), ethylene diamine tetraacetic acid disodium salt (0.82g), absolute ethanol (190 ml) and water (50 ml) was stirred magnetically. Over a period of 10 - 15 minutes, 30 - 35% $H_2O_2$ (40 ml) was added at room temperature. A deep red-brown solution formed. After four hours, water (200 ml) and solid $NaHCO_3$ to saturation were added. The mixture was extracted with benzene. This was washed four times with water, dried, and evaporated to dryness in vacuo on a 30°-35° C water bath. Weight of dark brown oil: 4.27g.

A column of silicic acid (100g, 65 - 200 mesh) was prepared in chloroform. The brown oil was added and eluted in chloroform.
Fraction
I — 150 ml (yellow band)→brown oil 1.80g A
II — 200 ml (yellow band)→brown oil 0.96g B
III — 200 ml (yellow band)→brown oil 1.90g C
IV — 200 ml (yellow band)→brown oil 0.64g D
V — 400 ml (yellow band)→brown oil 0.14g E Fraction C was chromatographed on silicic acid (200g Mallinckrodt CC7 special, 200-325 mesh) in ethanol-free chloroform. The elution was performed with ethanol-free chloroform.

| Fraction I - 2800 ml | brown gum 0.03g F |
| II - 450 ml | brown gum 0.24g G |
| III - 450 ml | brown gum 0.97g H |
| IV - 300 ml | brown gum 0.57g I |
| V - 2700 ml | brown solid .27g J |

Fraction H was a semi-solid material. Crystallization of a portion of H (0.5g) from light petroleum with a minimum of added methylene chloride under refrigeration for 28 hours produced an orange-red solid (0.36g), m.p. 116°-119° C.

Analysis: Calculated for hydroxy nitroxide, (m.w. 204), Found: C, 70.32; H, 6.59; N, 7.55; O, 15.79%; $C_{12}H_{14}NO_2$ requires: C, 70.56; H, 6.91; N, 6.86; O, 15.67%.

The complete analytical data on the orange-red material verified that the compound was a dimer of 1,2-dihydro-2,2,4-trimethyl-6-hydroxy-quinoline nitroxide of the formula:

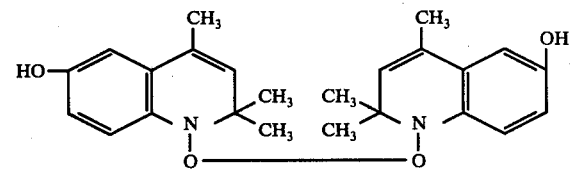

Nuclear magnetic resonance (NMR) analysis showed no ethoxy $CH_3$—$CH_2$—O—) grouping. Electron spin resonance (ESR) spectrum showed that no unpaired electron was present.

EXAMPLE 2

Nitroxide from Dihydroethoxyquin

The method described for ethoxyquin nitroxide in Example 1 was applied to dihydroethoxyquin (4.60g). Column chromatography of the crude reaction mixture gave a brown solid (1.84g) which was crystallized from methylene chloride-light petroleum. A brown solid (0.95g), m.p. 130°-132° C was isolated.

The chemical analysis of the foregoing compound was:
Found C, 69.97; H, 7.57; N, 7.03; O, 15.43%; $C_{12}H_{16}NO_2$ requires: C, 69.87; H, 7.83; N, 6.79; O, 15.51%.

Complete analytical data indicate the compound to be the dimer of 1,2,3,4-tetrahydro-2,2,4-trimethyl-6-hydroxy-quinoline nitroxide of the formula:

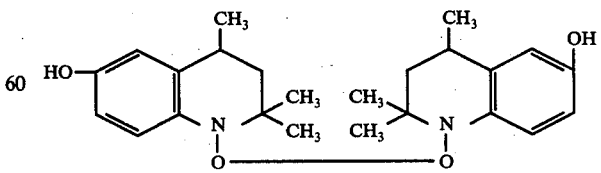

Other substituted 1,2-dihydro- and 1,2,3,4-tetrahydro-6-hydroxyquinoline nitroxide compounds of the formula I are prepared from correspondingly substituted 1,2-dihydro- and 1,2,3,4-tetrahydro-6-alkoxyquinoline starting materials by the procedure given in Example 1.

EXAMPLES 3-18

The nitroxide compounds from ethoxyquin and from dihydroethoxyquin, prepared as in Examples 1 and 2, respectively, were dissolved in separate portions of winterized soya oil to provide a 4.5% concentration and the resulting solutions were streaked on bacon slices, which had undergone a conventional nitrite cure and plant processing, in quantities providing levels of 1,2-dihydro-2,2,4-trimethyl-6-hydroxy-quinoline nitroxide of from 1 ppm to 100 ppm in the meat for one series of tests and levels of 1 – 20 ppm of the corresponding 1,2,3,4-tetrahydroquinoline nitroxide compound in the meat for another series of tests. Control slices of bacon were streaked with the oil alone. The bacon slices were fried under standardized conditions and the cook-out fat was analyzed for volatile nitrosamine content. The results are shown in the following Table:

| Example No. | Amount of Test Compound in Meat (ppm) | Nitrosamines In Cook-Out Fat (ppb)* | |
|---|---|---|---|
| | | Test Product | Control Product |
| 3 | Nitroxide from Ethoxyquin 100 | 0# | 18 |
| 4 | " 50 | 0 | 19 |
| 5 | " 10 | 3 | 19 |
| 6 | " 1 | 13 | 19 |
| 7 | " 20 | 0 | 8 |
| 8 | " 10 | 0 | 8 |
| 9 | " 1 | 2 | 8 |
| 10 | " 20 | 2 | 38 |
| 11 | " 10 | 5 | 38 |
| 12 | " 1 | 16 | 38 |
| 13 | Nitroxide from Dihydro Ethoxyquin 20 | 3 | 35 |
| 14 | " 10 | 13 | 35 |
| 15 | " 1 | 20 | 35 |
| 16 | " 20 | 2 | 36 |
| 17 | " 10 | 6 | 36 |
| 18 | " 1 | 22 | 36 |

*(ppb) = parts per billion
Figures below 3 ppb are not reliable because they are below the accuracy limit of the analytical procedure.

It will be seen from Table I that the nitroxides from ethoxyquin and dihydroethoxyquin showed excellent inhibition of nitrosamine formation in comparison with the untreated controls and, in addition, were consistent in their action. At 20 ppm level of incorporation in the meat they essentially blocked formation of nitrosamines and even at 1 ppm their action was significant. Since the fat resulting from fried, cured meat invariably contains the major portion of the nitrosamines formed during the frying, it has been demonstrated that the nitrosamine content of the fried meat has been virtually eliminated by use of the compounds of the invention.

It will be understood that the examples are for purposes of illustration only and that the compounds are likewise effective when incorporated in the meat by other methods as described herein.

The embodiments of the invention in which an exclusive property or privilege is claimed are defined as follows:

1. A meat treating composition comprising a solution or dispersion of a nitroxide derivative of a 1,2-dihydro- or 1,2,3,4-tetrahydro-6-alkoxyquinoline compound, in a nitrite-containing meat curing solution, the amount of said compound in said composition being effective to reduce the formation of nitrosamines in nitrite cured meat treated by said composition and cooked at frying temperature.

2. The meat treating composition of claim 1 wherein the compound is

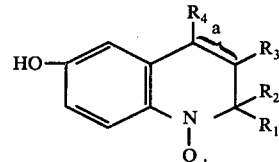

or a dimer thereof wherein the molecules are bonded at the oxygen atom of the nitroxide group, wherein:
   $a$ is a single or double bond, and
   $R_1$, $R_2$, $R_3$ and $R_4$ may be the same or different, and each are selected from the group consisting of hydrogen and alkyl group of from 1 to 6 carbon atoms.

3. The meat treating composition of claim 1 wherein the compound is 1,2,3,4-tetrahydro-2,2,4-tetrahydro-2,2,4-trimethyl-6-hydroxyquinoline nitroxide.

4. The meat treating composition of claim 1 wherein the compound is 1,2-dihydro-2,2,4-trimethyl-6-hydroxyquinoline nitroxide.

5. The meat treating composition of claim 1 wherein the meat curing solution is an aqueous solution and the compound is dispersed in said solution with the aid of an edible emulsifying agent.

6. The meat treating composition of claim 5 wherein the compound is present in the solution in an amount of about 0.001% to 0.2% based on the weight of the solution.

7. A composition for the curing of meats comprising an aqueous curing solution containing sodium chloride, a sugar, an alkali metal nitrite curing salt and from about 0.001% to 0.2% by weight of 1,2-dihydro- or 1,2,3,4-tetrahydro-2,2,,4-trimethyl-6-hydroxyquinoline nitroxide.

8. A process for nitrosamine control in nitrite cured meats comprising treating the meat before cooking with an effective amount of a nitroxide derivative of a 1,2-dihydro- or 1,2,3,4-tetrahydro-6-alkoxy-quinoline compound, to reduce the quantity of nitrosamines formed when the cured meat is cooked at frying temperature.

9. The process of claim 8 wherein the compound is

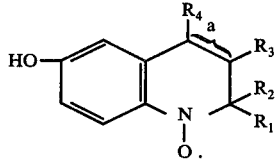

a dimer thereof wherein the molecules are bonded at the oxygen atom of the nitroxide group, wherein:
   $a$ is a single or double bond, and
   $R_1$, $R_2$, $R_3$ and $R_4$ may be the same or different and each are selected from the group consisting of hydrogen and an alkyl group of from 1 to 6 carbon atoms.

10. The process of claim 9 wherein the compound is applied to the meat in an amount such that the cured meat contains from about 1 to 200 parts by weight of the compound per million parts by weight of the meat.

11. The process of claim 9 wherein the compound is 1,2,3,4-tetrahydro-2,2,4-trimethyl-6-hydroxyquinoline nitroxide and is applied to the meat in an amount such that the cured meat contains from about 10 to 100 parts by weight of the compound per million parts by weight of the meat.

12. The process of claim 9 wherein the compound is 1,2,-dihydro-2,2,4-trimethyl-6-hydroxyquinoline nitroxide and is applied to the meat in an amount such that the cured meat contains from about 10 to 100 parts by weight of the compound per million parts by weight of the meat.

13. The process of claim 9 wherein the compound is dispersed in a nitrite curing solution and the solution is injected into the meat.

14. The process of claim 9 wherein the compound is dissolved in a liquid solvent medium and the solution is applied to surfaces of sliced cured meat.

15. The process of claim 9 wherein the meat is a pork cut for production of bacon.

16. The process of claim 14 wherein the meat is sliced bacon.

17. A process for the curing of bacon so as to reduce the quantity of nitrosamines formed when the cured bacon is subjected to frying temperatures, comprising curing said bacon with a nitrite curing solution containing an amount of a nitroxide derivative of a 1,2-dihydro or 1,2,3,4-tetrahydro-6-alkoxyquinoline compound, sufficient to provide from about 1 to 200 parts of the compound per million parts of the meat.

18. The process of claim 17 wherein the compound is 1,2,3,4-tetrahydro-2,2,4-trimethyl-6-hydroxyquinoline nitroxide or 1,2-dihydro-2,2,4-trimethyl-6-hydroxyquinoline nitroxide.

19. A process for the control of nitrosamine formation during cooking of nitrite cured bacon comprising applying to slices of the cured bacon a solution of a nitroxide derivative of a 1,2-dihydro- or 1,2,3,4-tetrahydro-6-alkoxyquinoline compound, said solution being applied to the bacon slices in an amount sufficient to provide from about 1 to 200 parts by weight of the said compound per million parts by weight of meat.

20. The process of claim 19 wherein the compound is 1,2,3,4-tetrahydro-2,2,4-trimethyl-6-hydroxyquinoline nitroxide or 1,2-dihydro-2,2,4-trimethyl-6-hydroxyquinoline nitroxide.

21. A nitrite cured meat product containing from about 1 to 200 parts by weight per million parts of the meat of a compound of the formula:

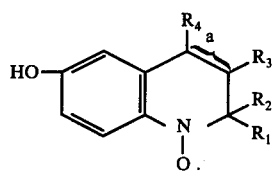

or a dimer thereof wherein the molecules are bonded at the oxygen atom of the nitroxide group wherein:

$R_1$, $R_2$, $R_3$ and $R_4$ are the same or different and each are selected from the group consisting of hydrogen and alkyl of from 1 to 6 carbon atoms and $a$ is a single or double bond.

22. The product of claim 19 wherein the compound is 1,2,3,4-tetrahydro-2,2,4-trimethyl-6-hydroxyquinoline nitroxide.

23. The product of claim 19 wherein the compound is 1,2-dihydro-2,2,4-trimethyl-6-hydroxyquinoline nitroxide.

* * * * *